(12) United States Patent
Chiang

(10) Patent No.: US 9,781,031 B2
(45) Date of Patent: *Oct. 3, 2017

(54) WIRELESS HOME NETWORK ROUTING PROTOCOL

(71) Applicant: EMPIRE TECHNOLOGY DEVELOPMENT LLC, Wilmington, DE (US)

(72) Inventor: Mung Chiang, Cherry Hill, NJ (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 31 days.

This patent is subject to a terminal disclaimer.

(21) Appl. No.: 14/855,386

(22) Filed: Sep. 16, 2015

(65) Prior Publication Data

US 2016/0006649 A1    Jan. 7, 2016

Related U.S. Application Data

(60) Continuation of application No. 14/037,403, filed on Sep. 26, 2013, now Pat. No. 9,148,807, which is a
(Continued)

(51) Int. Cl.
*H04L 12/753* (2013.01)
*H04L 12/28* (2006.01)
(Continued)

(52) U.S. Cl.
CPC ............ *H04L 45/48* (2013.01); *H04L 12/189* (2013.01); *H04L 12/2834* (2013.01);
(Continued)

(58) Field of Classification Search
CPC ... H04L 41/044; H04L 41/06; H04L 41/0654; H04L 41/0659; H04L 41/12; H04L 45/22; H04L 45/28
See application file for complete search history.

(56) References Cited

U.S. PATENT DOCUMENTS 6,594,261 B1    7/2003   Boura et al.
6,791,949 B1    9/2004   Ryu et al.
(Continued)

OTHER PUBLICATIONS

Byounghoon Kim et al., "A Virtual Link Routing Scheme in the Wireless Home Network Architecture Supporting End-to-end Seamless Connectivity", Wireless Communications and Mobile Computing, Nov. 6, 2007, pp. 1159-1169, vol. 7, Issue 10, Wiley InterScince.

(Continued)

*Primary Examiner* — Benjamin H Elliott, IV
(74) *Attorney, Agent, or Firm* — Turk IP Law, LLC

(57) ABSTRACT

An example method for a device to implement one of the nodes in a wireless network for processing packets includes submitting a request to a network-management system in the network to become a node in the network, after having registered with the network-management system, determining neighboring nodes, flooding the wireless network with a link-state advertisement, the link-state advertisement providing neighboring relationships of the node, constructing switching rules for the node based on a tree switching network portion of the network, processing the packets received by the node with the switching rules, the switching rules defining at least one of (1) an ingress link to a parent node with a power capability greater than the node and (2) egress links to child nodes with a mobility greater than the node, and in response to having determined a failed link to a neighboring node, informing a node at the end of an ingress wireless link and the network-management system of the failed link.

20 Claims, 10 Drawing Sheets

Related U.S. Application Data continuation of application No. 13/275,299, filed on Oct. 17, 2011, now Pat. No. 8,559,329, which is a division of application No. 12/358,258, filed on Jan. 23, 2009, now Pat. No. 8,064,360.

(51) Int. Cl.
| | | |
|---|---|---|
| *H04L 12/24* | (2006.01) | |
| *H04L 12/721* | (2013.01) | |
| *H04L 12/715* | (2013.01) | |
| *H04W 40/00* | (2009.01) | |
| *H04W 24/04* | (2009.01) | |
| *H04L 12/18* | (2006.01) | |
| *H04L 12/703* | (2013.01) | |
| *H04L 12/823* | (2013.01) | |

(52) U.S. Cl.
CPC .......... *H04L 12/2838* (2013.01); *H04L 41/12* (2013.01); *H04L 45/123* (2013.01); *H04L 45/28* (2013.01); *H04L 45/64* (2013.01); *H04L 47/32* (2013.01); *H04W 24/04* (2013.01); *H04W 40/00* (2013.01)

(56) References Cited

U.S. PATENT DOCUMENTS

| | | | |
|---|---|---|---|
| 7,561,527 | B1 | 7/2009 | Katz et al. |
| 7,729,337 | B2 | 6/2010 | Saleh et al. |
| 7,818,018 | B2 | 10/2010 | Nanda et al. |
| 8,064,360 | B2 * | 11/2011 | Chiang ............... H04L 12/2834 370/252 |
| 8,559,329 | B2 * | 10/2013 | Chiang ............... H04L 12/2834 370/252 |
| 9,148,807 | B2 * | 9/2015 | Chiang ............... H04L 12/2834 |
| 2003/0195946 | A1 | 10/2003 | Yang |
| 2003/0204619 | A1 | 10/2003 | Bays |
| 2004/0018839 | A1 | 1/2004 | Andric et al. |
| 2006/0062199 | A1 | 3/2006 | Yoshizawa |
| 2006/0187866 | A1 | 8/2006 | Werb et al. |
| 2008/0002599 | A1 | 1/2008 | Yau et al. |
| 2008/0144644 | A1 | 6/2008 | Allan et al. |
| 2008/0279204 | A1 | 11/2008 | Pratt, Jr. et al. |
| 2010/0061231 | A1 | 3/2010 | Harmatos et al. |
| 2010/0150120 | A1 | 6/2010 | Schlicht et al. |
| 2010/0188971 | A1 * | 7/2010 | Chiang ............... H04L 12/2834 370/225 |
| 2011/0019561 | A1 | 1/2011 | Yun et al. |
| 2012/0033577 | A1 * | 2/2012 | Chiang ............... H04L 12/2834 370/252 |
| 2012/0051339 | A1 | 3/2012 | Chamberlain et al. |
| 2012/0076492 | A1 | 3/2012 | Saleh et al. |
| 2014/0022893 | A1 * | 1/2014 | Chiang ............... H04L 12/2834 370/228 |
| 2016/0006649 | A1 * | 1/2016 | Chiang ............... H04L 12/2834 370/225 |

OTHER PUBLICATIONS

Thanh Tung Nguyen et al., "Reliable Location-based Routing Algorithm in Digital Home Network Scenarios", Proceedings of the Sixth IEEE International Conference on Computer and Information Technology, 2006.

Dahai Xu et al., "Link-State Routing With Hop-by-Hop Forwarding Can Achieve Optimal Traffic Engineering", IEEE INFOCOM 2008 proceedings, 2008, pp. 1139-1147.

Dahai Xu et al., "Link-State Routing With Hop-by-Hop Forwarding Can Achieve Optimal Traffic Engineering", IEEE/ACM Transactions on Networking, Dec. 2011, pp. 1717-1730, vol. 19, No. 6.

\* cited by examiner

| 204 | Tier A node | | |
|---|---|---|---|
| 702 | ID information:<br>IP address, physical<br>address, tier-type | 710 | LSAs:<br>Neighboring<br>relationships, link costs |
| 704 | Groups:<br>Member nodes | 712 | Link weights:<br>source node, destination<br>node, link weight (w),<br>tree structure |
| 706 | Neighbor nodes:<br>IP address, physical<br>address, tier-type | 714 | Routing table:<br>destination node,<br>neighbor node |
| 708 | Tier A node links:<br>IP address, physical<br>address, link cost,<br>fading level (v) | | |

FIG. 7

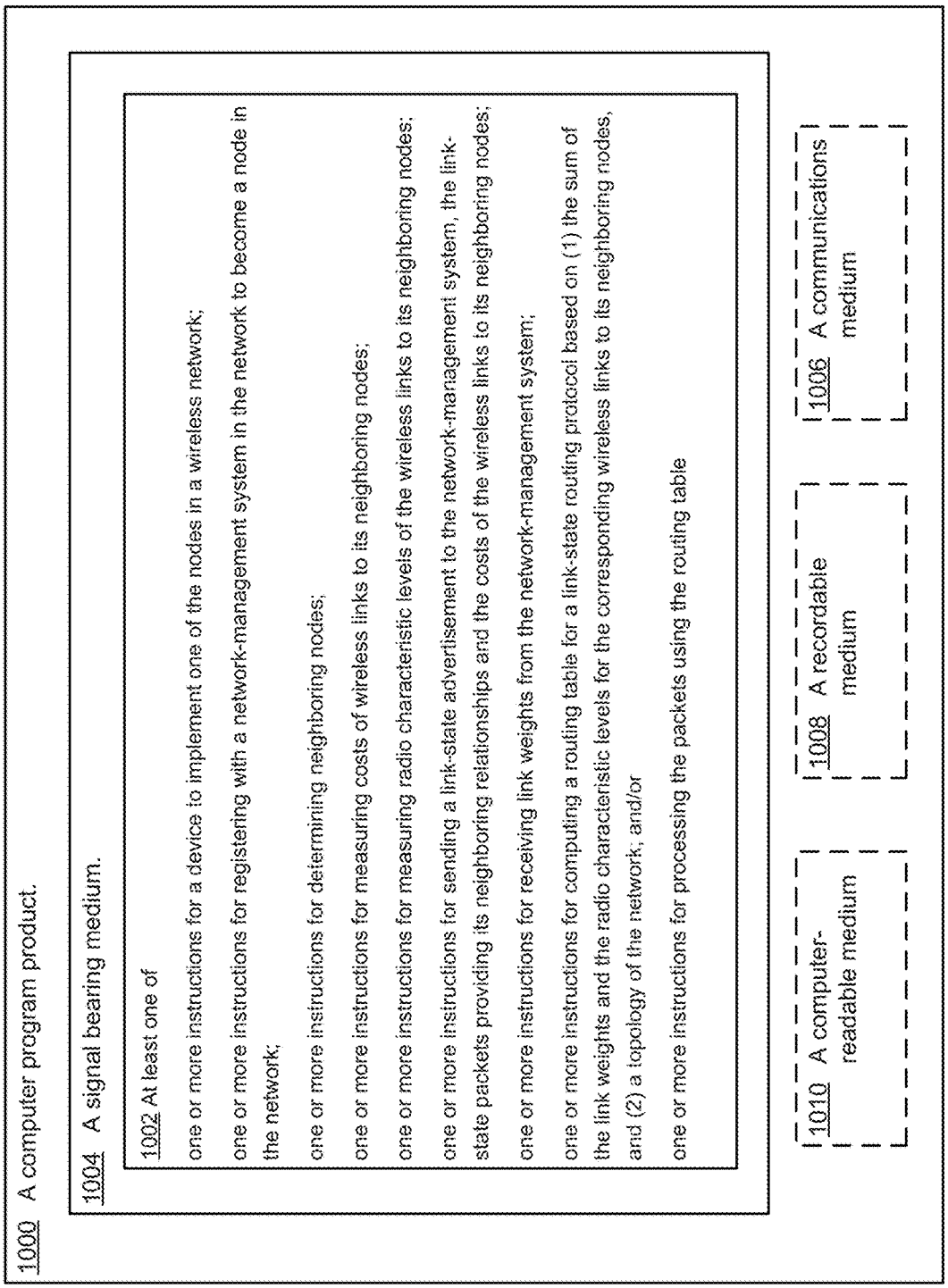

WIRELESS HOME NETWORK ROUTING PROTOCOL

CROSS-REFERENCE TO RELATED APPLICATIONS

The present application is a continuation application under 35 U.S.C. §120 of the U.S. Nonprovisional application Ser. No. 14/037,403, now U.S. Pat. No. 9,148,807, and was filed on Sep. 26, 2013 (hereinafter the "'403 Application"). The '403 Application is a continuation application under 35 U.S.C. §120 of the U.S. Nonprovisional application Ser. No. 13/275,299, now U.S. Pat. No. 8,559,329, and was filed on Oct. 17, 2011 (hereinafter the "299 Application"). The '299 Application is a divisional application under 35 U.S.C. §121 of the U.S. Nonprovisional application Ser. No. 12/358,258, now U.S. Pat. No. 8,064,360, and was filed on Jan. 23, 2009 (hereinafter the "'258 Application"). The '403 Application, '299 Application, and the '258 Application, including any appendices or attachments thereof, are incorporated by reference herein in their entirety.

BACKGROUND

Description of the Related Art

Unless otherwise indicated herein, the approaches described in this section are not prior art to the claims in this application and are not admitted to be prior art by inclusion in this section.

Wireless home networks are well known for sharing Internet access and other resources between wireless devices. FIG. 1 illustrates a conventional wireless home network 100 with access to the Internet 102. The wireless home network 100 is centered on a home gateway device such as a wireless router 104, which has access to the Internet 102. Wireless devices 108 such as a desktop computer 108A, a laptop computer 108B, and a personal digital assistant (PDA) 108C, can access the Internet 102 through wireless connections (dotted lines in FIG. 1) to the wireless router 104. In addition, the wireless devices 108 can communicate with each other using an indirect network connection through the wireless router 104.

Furthermore, the wireless devices 108 on the wireless home network 100 can communicate with a distant server computer 110 on the Internet 102. The Internet 102 may utilize a variety of possible routing methods, such as the conventional link-state routing, to send data packets between nodes A, B, C, and D that form part of the network. For example, to send a file from the desktop computer 108A to the server computer 110, the file is first broken up into packets of data, and the packets are then sent from the desktop computer 108A to the wireless router 104. From there, the packets travel through the nodes on the Internet 102 using a link-state routing protocol before reaching the server computer 110.

Conventional link-state routing protocols have three components. First is weight computation: a network-management system computes a set of link weights through a periodic and centralized optimization. Second is traffic splitting: each router or node uses the link weights to decide traffic splitting ratios for every destination among its outgoing links. Third is packet forwarding: each router independently decides which outgoing link to forward a packet based only on its destination prefix in order to realize the desired traffic splitting. The popularity of link-state protocols can be attributed to their ease of management; in particular, each router's decision on traffic splitting is conducted autonomously without further assistance from the network-management system, and each packet's forwarding decision is made hop-by-hop without memory or end-to-end tunneling.

Such simplicity seems to carry a cost on optimality. In a procedure known as Traffic Engineering (TE), network operators minimize a convex cost function of the link loads by tuning the link weights to be used by the routers. With Open Shortest Path First (OSPF), the major variant of link-state protocol in use today, computing the right link weights is NP-hard, and even the best setting of the weights can deviate significantly from optimal TE. However, a new link-state routing protocol termed Penalizing Exponential Flow-spliTting (PEFT) proved that it can achieve optimal TE. Link weight computation for PEFT has demonstrated to be highly efficient in theory and in practice.

In PEFT, packet forwarding is just the same as OSPF: destination-based and hop-by-hop. The key difference is in traffic splitting. OSPF splits traffic evenly among the shortest paths, and PEFT splits traffic along all paths but penalizes longer paths (i.e., paths with higher sums of link weights) exponentially. While this is a difference in how link weights are used in the routers, PEFT also provide a new way of calculating link weights. Research has shown that using link weights in the PEFT way achieves optimal traffic engineering.

The example Internet 102 in FIG. 1 includes nodes A, B, C, and D with link weights provided between every two nodes. To send packets from node A to node D using the OSPF link-state protocol, packets from node A are evenly split between the two shortest paths A-B and A-C, with each path having a link weight of 2. Using the PEFT protocol, the packets from node A are split between all paths (A-B, A-C, and A-D), with the longer path A-D getting less packets as a result of being penalized exponentially for its higher link weights.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 7 is a block diagram of the data structure for the tier A node without the network-management system in one embodiment of the disclosure.

FIG. 10 is a block diagram illustrating a computer program product implementing the hierarchical wireless network routing protocol in one embodiment of the disclosure.

Use of the same reference numbers in different figures indicates similar or identical elements.

DETAILED DESCRIPTION

Figure 1:
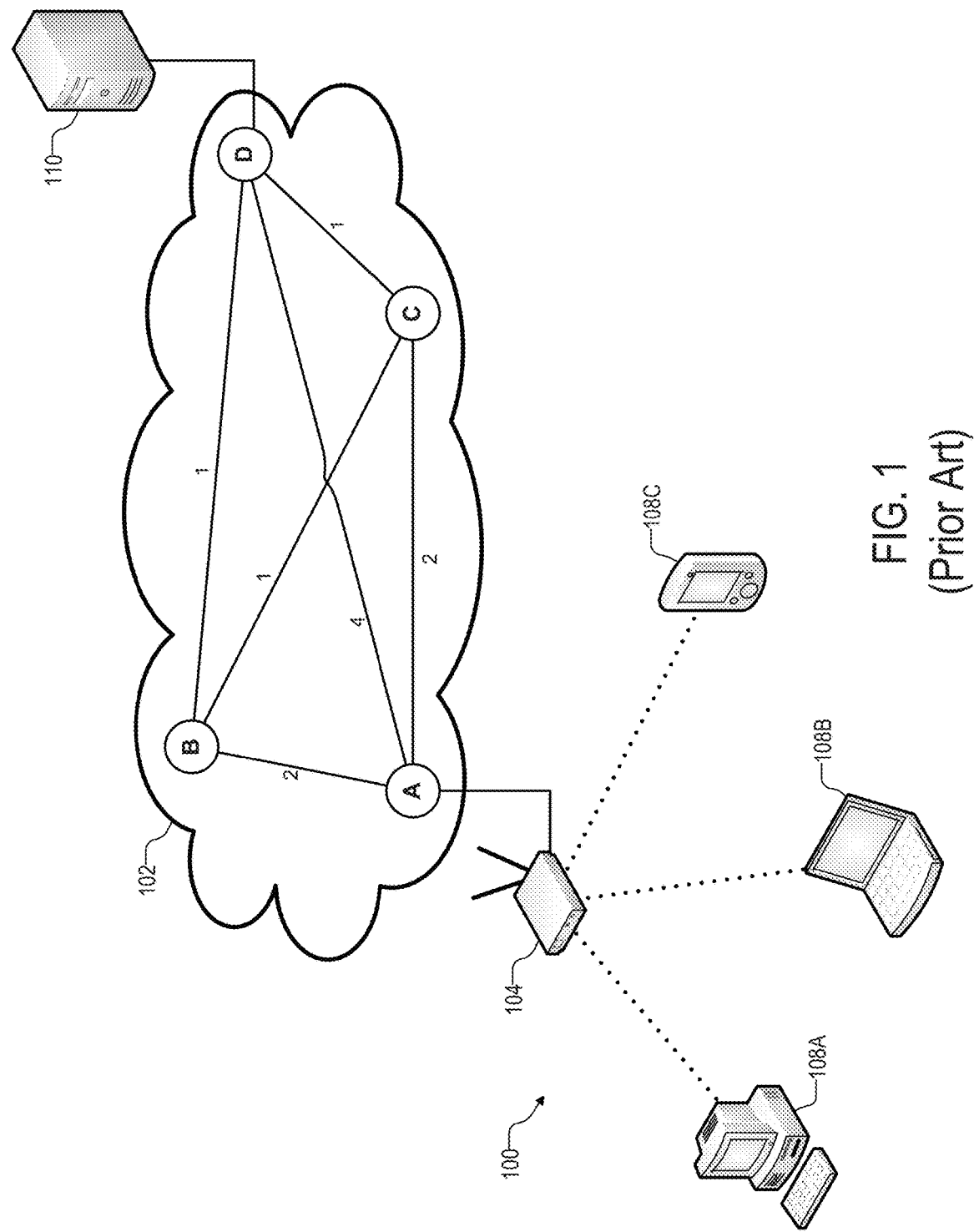
FIG. 1 illustrates a conventional wireless home network with access to the Internet, where the example Internet utilizes conventional link-state routing.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs and systems related to a hierarchical wireless home network.

Consumers prefer a home network that is free of wires. With the proliferation of wireless devices in the home environment, ranging from home gateways, desktop computers, printers, laptop computers, and PDAs, to almost every electronic device imaginable, an efficient and robust wireless home network is essential to allow these wireless devices to communicate with each other. The present disclosure provides a "hierarchical wireless network" that leverages the advantages of some wireless devices, while mitigating the liabilities of other wireless devices.

Figure 2A:
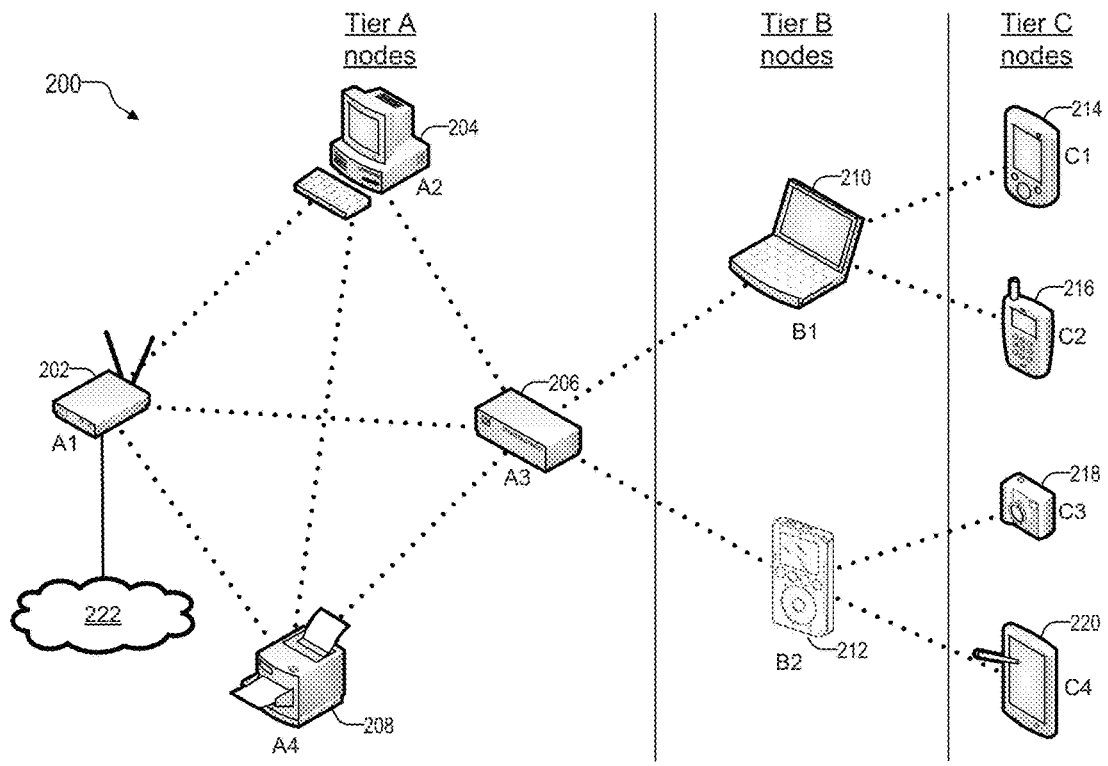
FIG. 2A illustrates the wireless devices in a hierarchical wireless network in one embodiment of the disclosure.

FIG. 2A illustrates the wireless devices in a hierarchical wireless network 200 in one embodiment of the disclosure. Wireless devices in the hierarchical wireless network 200 are categorized into three tiers of nodes. Tier A nodes are wireless devices that are typically stationary and have unlimited power supply. Unlimited power supply can be defined as receiving power from a source other than a battery, e.g., AC power from an electrical outlet. Tier A nodes can include a wireless home gateway device 202, a desktop computer 204, a set-top box 206, and a printer 208. Home gateway device 202 may be a wireless router, a wireless cable modem, a wireless DSL modem, or other similar devices that allows the connection of the network 200 to the Internet 222. Tier B nodes are wireless devices that are typically stationary and battery-powered. Tier B nodes can include a stationary laptop computer 210 running on battery and a stationary portable media player such as an iPod 212 running on battery. Tier C nodes are wireless devices that are typically mobile and battery-powered. Tier C nodes can include a wireless PDA 214, a cell phone 216, a digital camera 218, and a tablet PC 220. Certain wireless devices, such as a laptop computer, can be classified as a tier A, B, or C node depending on how the wireless device is used (stationary vs. mobile and AC powered vs. battery powered).

Figure 2B:
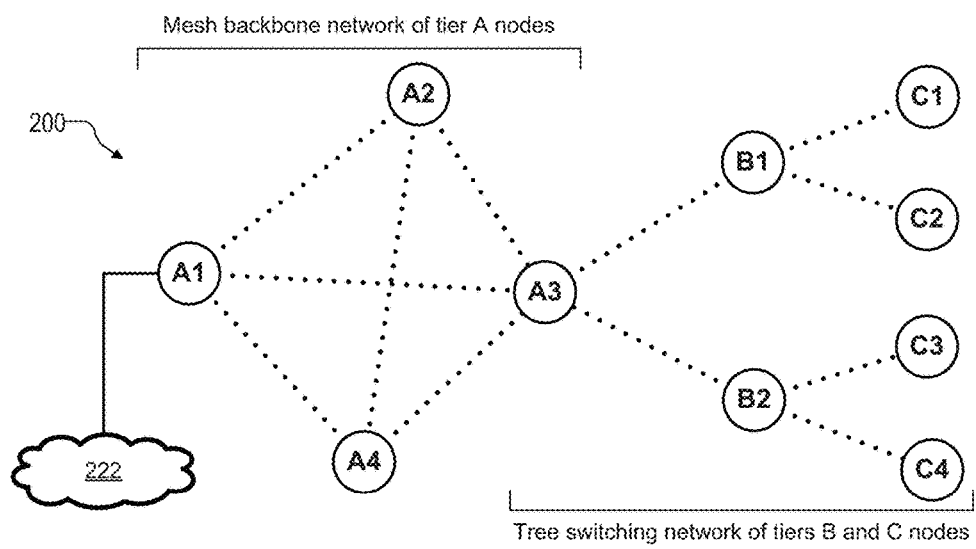
FIG. 2B illustrates a schema of the nodes in the hierarchical wireless network in one embodiment of the disclosure.

FIG. 2B illustrates a schema of the nodes in the hierarchical wireless network 200 in one embodiment of the disclosure. Tier A nodes in the hierarchical wireless network 200 establish and form wireless point-to-point unidirectional or bidirectional links with each other to construct a mesh backbone network portion of the hierarchical wireless network 200. A tier A node can link to more than one other tier A node. Tier A nodes can transmit packets to each other directly, or indirectly through one or more other tier A node using a routing protocol. Routing protocols are commonly used in wired networks, such as in the Internet. Thus, tier A nodes function as routers that forward packets to their destination node. Packets can be sent from a source node to a destination node through more than one path. For example, node A2 can send packets to node A4 through the following paths: A2-A4, A2-A1-A4, A2-A3-A4, A2-A1-A3-A4, and A2-A3-A1-A4. Therefore, if one path suffers from interference, or if an intermediate node is down, the packets can be re-routed to their destination node through a different path. The mesh backbone network can also expand the wireless range of the tier A nodes collectively. For example, the wireless range of a source node may not reach a destination node directly, but can be reached indirectly through other nodes.

A tier B node establishes and forms a wireless point-to-point unidirectional or bidirectional link with one tier A node, and a tier C node establishes and forms a wireless point-to-point unidirectional and bidirectional link with one tier B node or optionally with one tier A node. As a result, tiers B and C nodes form a tree switching network portion of the hierarchical wireless network 200 where there is only one path to each tier B or tier C node. Since tier B and C nodes have a limited power supply and since tier C nodes are mobile, they are not relied upon to forward packets unless their presence is the only way to reach certain nodes.

In one embodiment of the disclosure, one of the tier A nodes operates a network-management system for the hierarchical wireless network 200. Typically, the network-management system resides in a home gateway device with access to the Internet 222, such as the home gateway device 202 in FIG. 2A. The network-management system registers the nodes in the network, collects link costs from the nodes, calculates and sends link weights to the nodes. In addition, the network-management system can receive route history from the nodes and use the route history information to set routes instead of reconstructing the topology.

In one embodiment of the disclosure, a node can broadcast packets to a group of nodes, where nodes with similar interests form a group during the initiation stage. The broadcast nature of wireless transmission allows for a physical layer multicast to a group of nodes instead of multiple unicasts to individual nodes.

In one embodiment of the disclosure, packets in the network 200 can incorporate one or more bits to mark a packet as important. Battery-powered and mobile wireless devices such as tier B and C nodes often have small buffers. When the application layer protocol allow, inserting a field relating the importance level of the data into the routing layer packets can protect important packets from being discarded from the buffer before less important packets.

Figure 3:
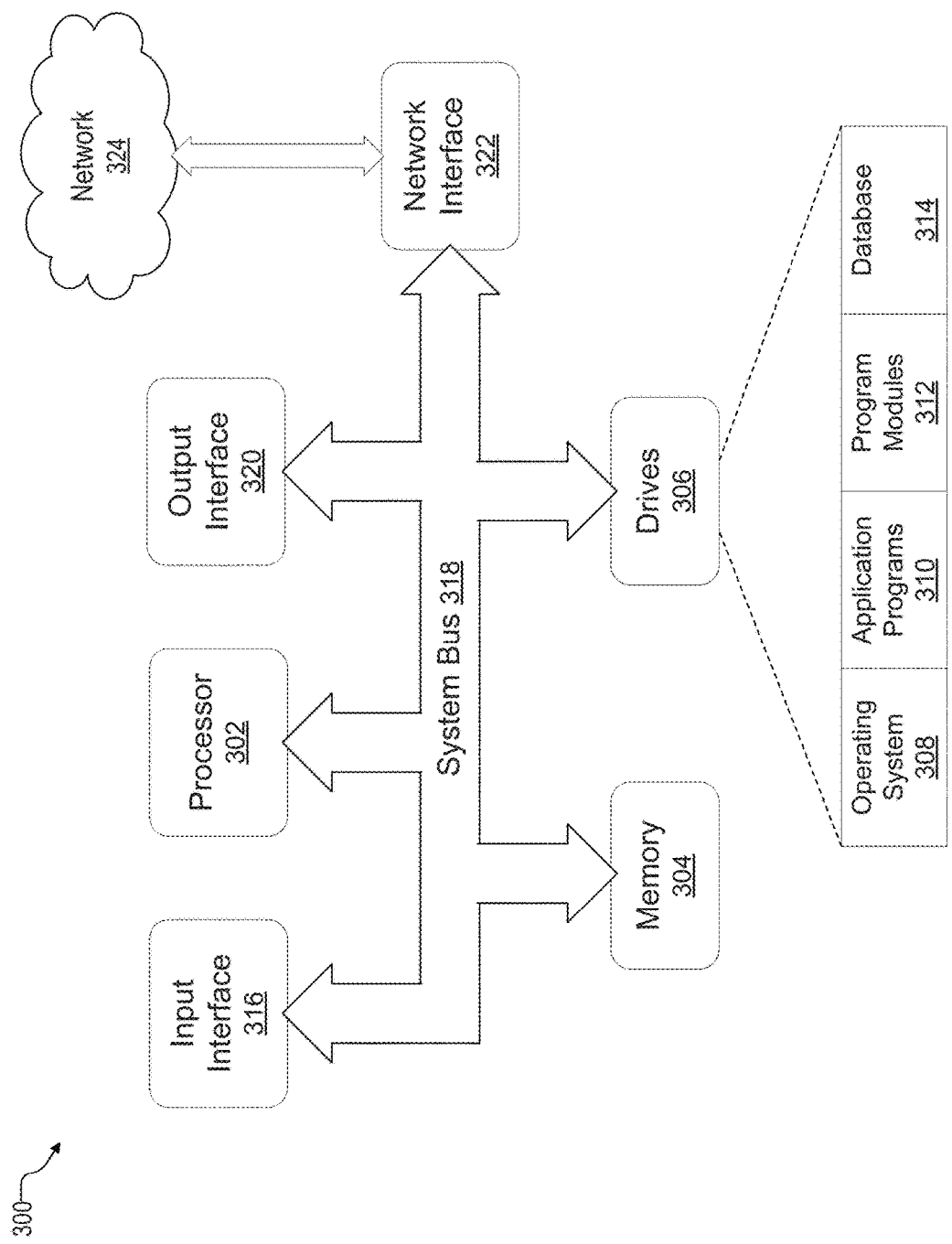
FIG. 3 illustrates an exemplary wireless device for implementing embodiments of the hierarchical wireless network in one embodiment of the disclosure.

FIG. 3 illustrates an exemplary wireless device 300 for implementing embodiments of the hierarchical wireless network. Wireless device 300 includes a processor 302, memory 304, and one or more drives 306. Drives 306 provide storage of computer readable instructions, data structures, program modules, content, and other data for wireless device 300. Drives 306 can include an operating system 308, application programs 310, program modules 312, and database 314. Wireless device 300 further includes an input interface 316 through which commands and data may be entered. Input devices connected to the input interface 316 can include an electronic digitizer, a microphone, a keyboard and a pointing device, commonly referred to as a mouse, trackball or touch pad. Other input devices may include a joystick, game pad, satellite dish, scanner, or the like.

These and other input devices can be connected to processor 302 through the input interface 316 that is coupled to a system bus 318, but may be connected by other interface and bus structures, such as a parallel port, game port or a universal serial bus (USB). Wireless device 300 may also include other peripheral output devices such as speakers and video displays which may be connected through an output interface 320 or the like.

Wireless device 300 may operate in a networked environment using logical connections to one or more remote devices through a network interface 322. The remote computer may be another wireless device, a personal computer, a server, a router, a network PC, a mobile phone, a peer device, or other common network node, and can include many or all of the elements described above relative to wireless device 300. Networking environments are commonplace in offices, enterprise-wide area networks (WAN), local area networks (LAN), intranets and the Internet. For example, in the present application, wireless device 300 may comprise the source machine from which data is being migrated, and the remote computer may comprise the destination machine or vice versa. Note, however, that source and destination machines need not be connected by a network 324 or any other means, but instead, data may be migrated via any media capable of being written by the source platform and read by the destination platform or platforms. When used in a LAN or Wireless LAN (WLAN) networking environment, wireless device 300 is connected to the LAN through network interface 322 or an adapter. When used in a WAN networking environment, wireless device 300 typically includes a modem or other means for establishing communications over the WAN, such as the Internet or network 324. It will be appreciated that other means of establishing a communications link between the computers may be used.

According to one embodiment, wireless device 300 is connected in a wireless networking environment such that the processor 302 and/or program modules 312 can perform hierarchical wireless networking with embodiments herein.

Figure 4:
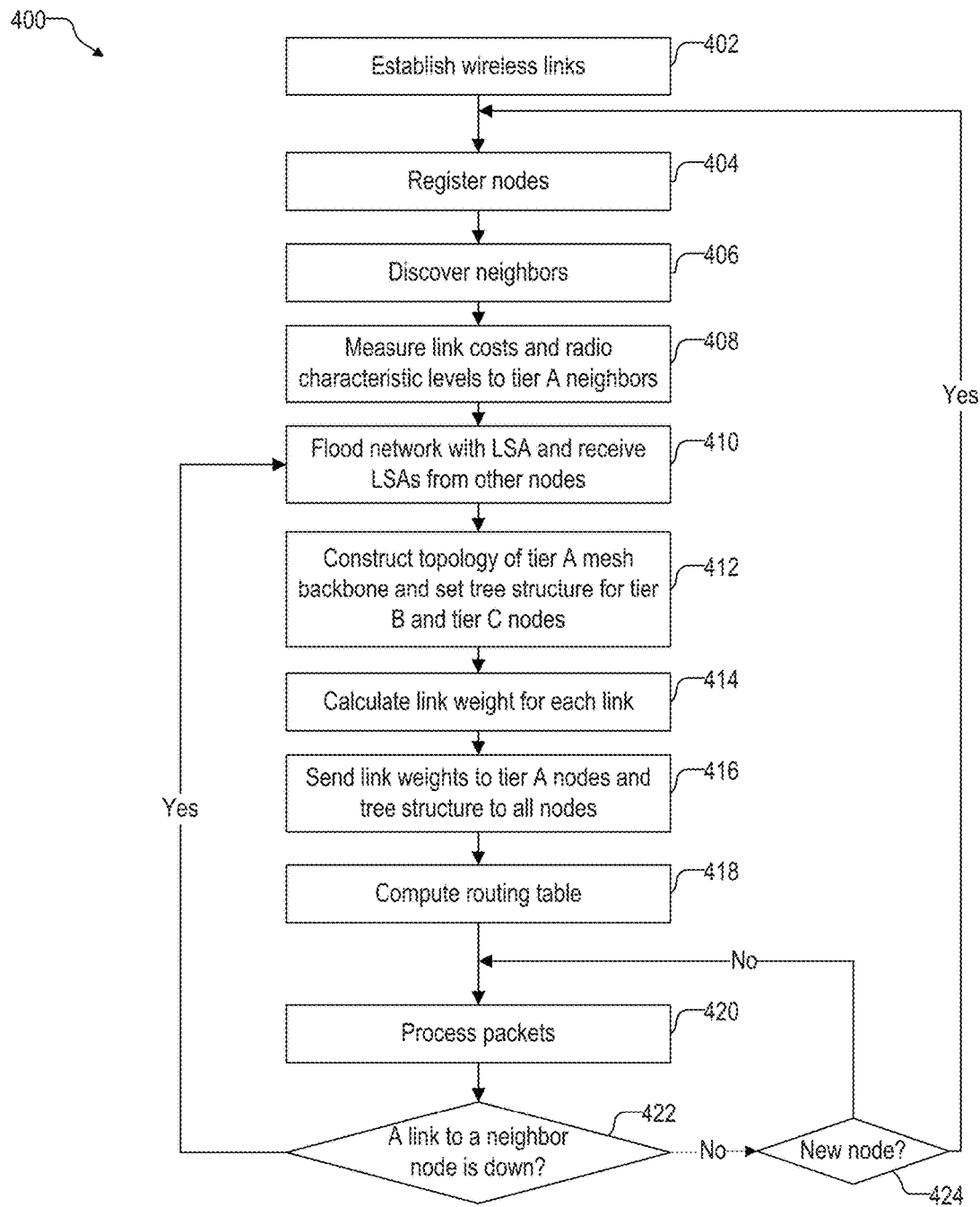
FIG. 4 is a flowchart of a method executed by a tier A node operating a network-management system for implementing a hierarchical wireless network routing protocol in one embodiment of the disclosure.
Figure 5:
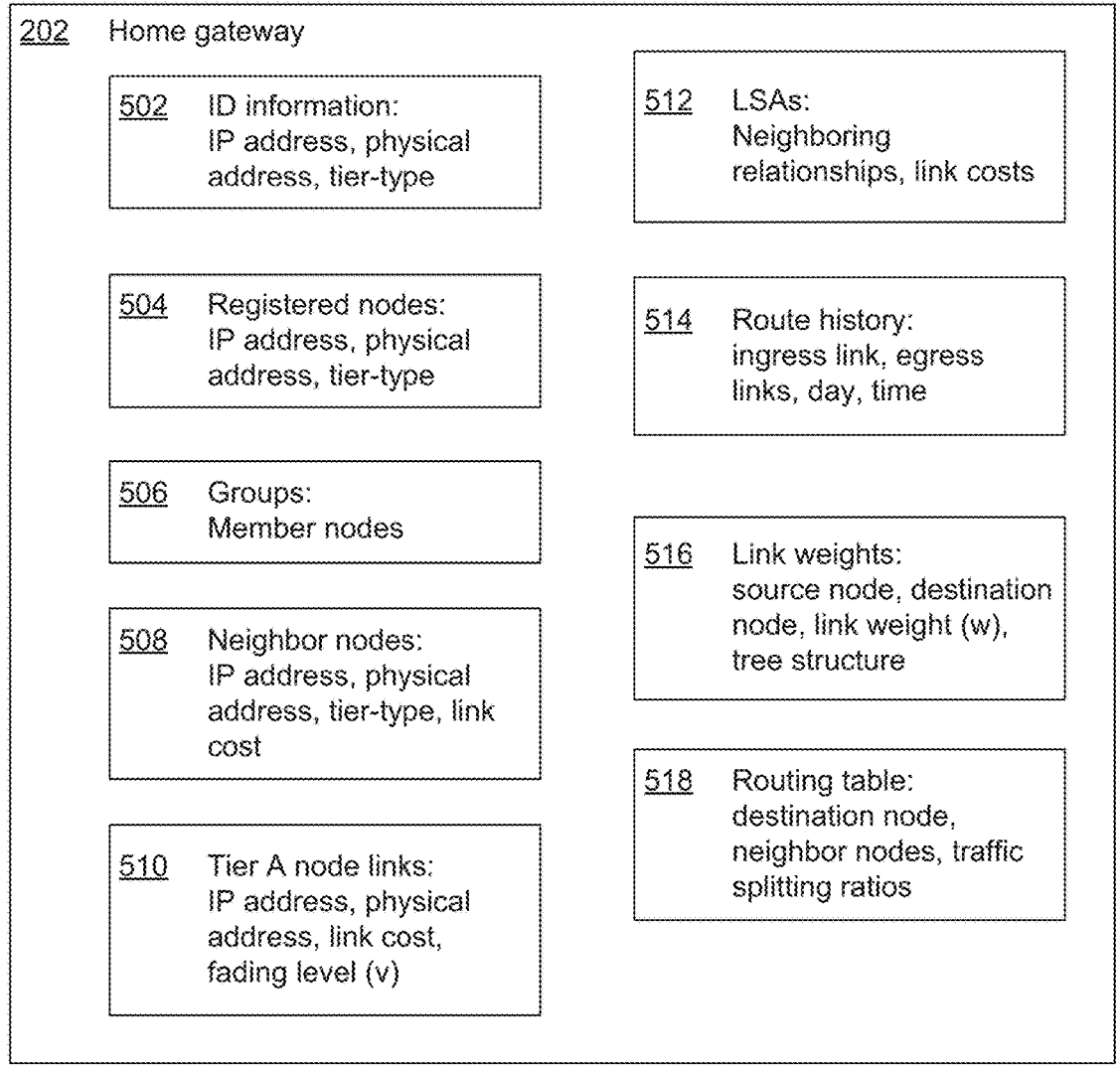
FIG. 5 is a block diagram of the data structure for the tier A node operating the network-management system in one embodiment of the disclosure.

FIG. 4 is a flowchart of a method 400 executed by a tier A node operating a network-management system (e.g., home gateway 202 in FIG. 2A) for implementing a wireless network routing protocol in one embodiment of the disclosure. FIG. 5 is a block diagram of the data structure for the home gateway 202 in one embodiment of the disclosure. The data structure includes ID information 502 of the home gateway 202, such as its IP address, physical (MAC) address, and tier-type.

Referring back to FIG. 4, in step 402, the home gateway 202 establishes wireless point-to-point unidirectional or bidirectional links with nearby devices that are within its radio range. Step 402 is followed by step 404.

In step 404, the home gateway 202 registers devices that request to join or rejoin the network 200 as new nodes. In one embodiment, the home gateway 202 periodically broadcasts a beacon identifying its IP address and its identity as the network-management system. The beacon is forwarded from device to device. Upon receiving the beacon, a new node sends a registration request directly or indirectly through another node to the home gateway 202. Information in the registration request can include the new node's physical address and tier-type (tier A, B or C). Alternatively, the home gateway 202 determines the tier-type of the new node.

In response to the registration request, the home gateway 202 assigns an IP address to the new node and sends the IP address in a reply to the node. The home gateway 202 stores the new node's IP address, physical address, and tier-type in its list of registered nodes 504 (FIG. 5). Alternatively, the home gateway 202 registers the new node under an IP address selected by the node. In that case, the new node first selects its own IP address and broadcasts the IP address to all the nodes on the network 200. If the IP address conflicts with an existing node on the network 200, the new node would select a different address (e.g., increment the address by one) and broadcast the address to the network again. The new node would repeat this step until it has selected an IP address that does not conflict with another node on the network 200.

In one embodiment, the home gateway 202 can also register the new node to a group 506 (FIG. 5) of nodes that share a common interest. For example, network 200 may include a group of nodes that share an interest in the latest weather forecasts, stock prices, or sporting news and scores. The home gateway 202 can provide information about the group to the new node, and add the new node to the group's membership list and provide the membership list to the node at the request of the node. The home gateway 202 can also create a new group at the request of the new node or join any group itself. Step 404 is followed by step 406.

In step 406, the home gateway 202 determines its neighboring nodes. Neighboring (or neighbor) nodes are nodes that have a wireless point-to-point unidirectional or bidirectional link to the home gateway 202. Any technique can be used to determine the neighboring nodes. In one embodiment, the home gateway 202 broadcasts a "HELLO" message containing its IP address, physical address, and tier-type to the neighboring nodes. The neighboring nodes that receive the HELLO message each sends a reply containing its IP address, physical address, and tier-type to the home gateway 202, acknowledging receipt of the HELLO message. The home gateway 202 then updates its list of neighbor nodes 508 (FIG. 5) with this information. Step 406 is followed by step 408.

In step 408, the home gateway 202 measures the costs of the links to its tier A neighbors. Any technique can be used to assign the link cost. In one embodiment, the home gateway 202 measures the link cost by sending an "ECHO" message to a tier A neighbor. Upon receiving the ECHO message, the tier A neighbor node sends a reply to the home gateway 202. The home gateway 202 then sets the link cost equal to the round-trip time it took to send the ECHO message and receive the reply divided by two. The home gateway 202 also measures the radio characteristics of the links to its tier A neighbors, such as fading levels (v). The home gateway 202 stores this information in its list of tier A links 510 (FIG. 5), where each link is identified by its tier A neighbor's IP address and physical address. Step 408 is followed by step 410.

In step 410, the home gateway 202 floods the network 200 with its link state advertisement (LSA). The LSA identifies the originating node and its neighboring nodes by IP and physical addresses (neighboring relationships). The home gateway 202 also receives LSAs 512 (FIG. 5) from the other nodes in the network 200. The LSAs 512 from the other nodes also include the link costs to their tier A neighboring nodes.

In one alternative embodiment, the home gateway 202 does not flood the network 200 with its LSA but sends the neighboring relationships of all the tier A node devices along with the link weights to the tier A node devices in step 416. This alternative embodiment is described later with step 416 for the home gateway 202 and steps 610 and 612 for the other tier A node devices. Step 410 is followed by step 412.

In step 412, the home gateway 202 determines the topology of the network 200. The home gateway 202 first constructs the topology of the tier A mesh backbone network from the neighboring relationships of the tier A nodes. Any technique can be used to construct the topology of the tier A mesh backbone network. The home gateway 202 then centrally organizes the tier B and tier C nodes into a tree structure to complete the topology of the network 200. Alternatively, the tier B and the tier C nodes organize themselves into a tree structure in a distributed manner and inform the home gateway 202 of their neighboring relationships. In either case, any centralized or distributed technique can be to organize the tier B and tier C nodes into a tree structure. Typically the tree structure links a tier B node to the tier A node with whom it has the strongest signal.

In one embodiment, the LSA from a tier B or a tier C node further includes the route history 514 (FIG. 5) of the node. The route history 514 includes the switching rules used by the node for implementing the tree structure and the times and the days they were used. The home gateway 202 optionally uses the saved switching rules for a node when that node reregisters instead of reconstructing the tree structure each time that node reregisters with the home gateway. Step 412 is followed by step 414.

In step 414, the home gateway 202 calculates and optimizes the link weights (w) using a routing protocol based on the link costs. The routing protocol may be PEFT, a predecessor of PEFT called DEFT (Distributed Exponentially-weighted Flow spliTting), OSPF, or another routing protocol. The home gateway 202 stores a table 516 (FIG. 5) of link weights (w), where each link is identified by the source and destination nodes. Step 414 is followed by step 416.

In step 416, the home gateway 202 sends the table 516 of link weights (w) and the tree structure of the tier B and tier C nodes to each of the tier A nodes. Instead of the tree structure of the tier B and tier C nodes, the home gateway 202 can send the knowledge of which node B to push a packet destined for each of the tier C nodes (without knowing how tier B nodes forward the packet). Each tier A node constructs the topology of network 200 and computes a routing table based on the link weights (w). When the home gateway 202 centrally determines the tree structure of the tier B and tier C nodes, the home gateway also sends the tree structure to each of the tier B and the tier C nodes. Each tier B node uses the tree structure to form the switching rules that define the ingress link from a parent node and the egress links to child nodes. Each tier C node uses the tree structure to form the switching rule that defines the ingress link to a parent node.

In the alternative embodiment introduced in step 410 and described later in steps 610 and 612 for the other tier A node devices, the home gateway 202 also sends the neighboring relationships of all the tier A node devices along with the link weights (w) so the other tier A node devices can determine the topology of the network 200. Step 416 is followed by step 418.

In step 418, the home gateway 202 computes a routing table 518 using the routing protocol from step 414 based on the topology of the network 200. The routing table 518 defines the next hops for every destination, and the traffic splitting ratios between the next hops. In one embodiment, the home gateway 202 adds the fading levels (v) of its tier A links 510 (FIG. 5) to the corresponding link weights (w) so that a noisy wireless link is given a higher weight. Step 418 is followed by step 420.

In step 420, the home gateway 202 process packets. For incoming packets, the home gateway 202 determines if it is the destination node based on the destination IP address in the packets. When it is not the destination node, the home gateway 202 looks up the destination node in the routing table 514 and splits the packets among the next hops to achieve the desired traffic splitting ratios. A similar process is used when the home gateway 202 sends packets.

As described above, the network 200 may have groups of nodes that share interest in common information. Assuming it is a member of such a group, the home gateway 202 can multicast information to multiple recipients instead of unicasting the same information to multiple recipients. The home gateway 202 can also receive a multicast of information from another member of the group. This feature allows the nodes to take advantage of the wireless transmission medium and protocol to send information to multiple nodes simultaneously. Step 420 is followed by step 422.

In step 422, the home gateway 202 determines whether any of the links to its neighbor nodes is down. The home gateway 202 does this by periodically transmitting probes (e.g., HELLO messages) to the neighbor nodes. When a neighbor node does not respond, the home gateway 202 assumes the link has failed. The home gateway 202 also determines if it receives a message from a tier B or tier C node device indicating that one of its links is down as described later in step 826 and 828 for a tier B or tier C node device. If any of its links is down, step 422 loops back to step 410 so all the tier A nodes can reconstruct their routing tables to compensate for the failed link. If its links are up, then step 422 is followed by step 424.

In step 424, the home gateway 202 determines if a new node has appeared and requests to register with the home gateway 202 to join the network 200. If so, step 424 loops back to step 404. Otherwise step 424 loops back to step 420 where it continues to process packets.

Figure 6:
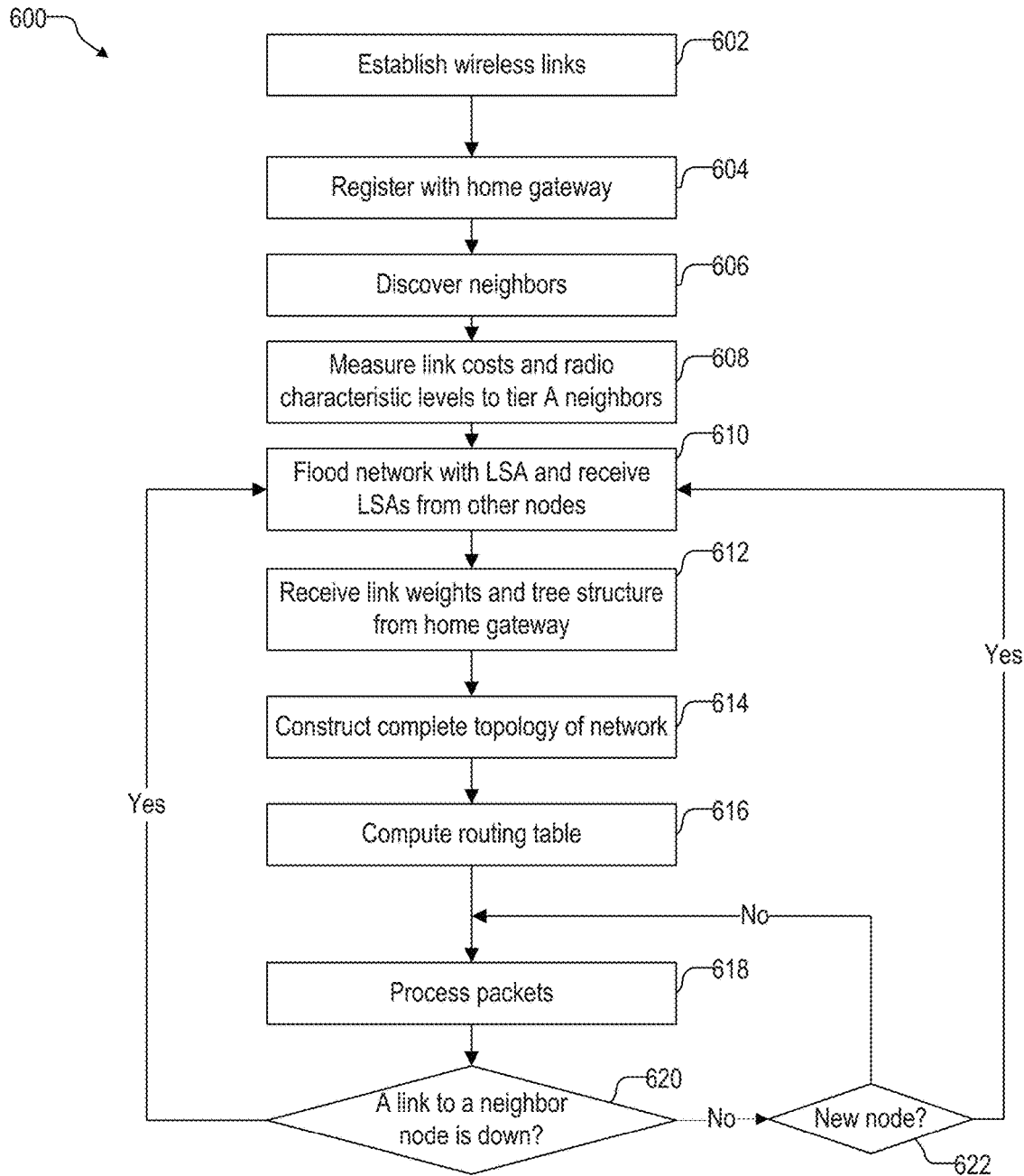
FIG. 6 is a flowchart of a method executed by a tier A node without the network-management system for implementing the hierarchical wireless network protocol in one embodiment of the disclosure.

FIG. 6 is a flowchart of a method 600 executed by each non-network-management system tier A node (e.g., devices 204 in FIG. 2A) for implementing the wireless network routing protocol in one embodiment of the disclosure. FIG. 7 is a block diagram of the data structure for the tier A node device 204 in one embodiment of the disclosure. The data structure includes ID information 702 of the device 204, such as its IP address, physical (MAC) address, and tier-type.

Referring back to FIG. 6, in step 602, the tier A node device 204 establishes wireless point-to-point unidirectional or bidirectional links with nodes in the network 200 that are within its radio range. Step 602 is followed by step 604.

In step 604, the tier A node device 204 registers with the network-management system (e.g., home gateway 202) to join the network 200 as a new node as described above in step 404 for the home gateway 202. The tier A node device 204 can also join a group of nodes that share a common interest through the home gateway 202 and receive the membership list of the group 704 (FIG. 7) as described above in step 404. Step 604 is followed by step 606.

In step 606, the tier A node device 204 determines its neighboring nodes 706 (FIG. 7). This step is the substantially the same as step 406 described above for home gateway 202 and therefore is not further elaborated. Step 606 is followed by step 608.

In step 608, the tier A node device 204 measures the costs and the radio characteristics, such as fading levels (v), of the links 708 (FIG. 7) to its tier A neighbors. This step is the substantially the same as step 408 described above and therefore is not further elaborated. Step 608 is followed by step 610.

In step 610, the tier A node device 204 floods the network 200 with its LSA. Similarly, the tier A node device 204 receives LSAs 710 (FIG. 7) from the other nodes in the network 200. The LSAs 710 are used by each tier A node to construct the topology of the network 200. This is the substantially the same as step 410 described above and therefore is not further elaborated.

In the alternative embodiment introduced above in steps 410 and 416 for the home gateway 202, each tier A node device sends its LSA to the home gateway 202 instead of flooding the network 200 with its LSA. Step 610 is followed by step 612.

In step 612, the tier A node device 204 receives link weights (w) and the tree structure for the tier B and tier C nodes from the home gateway 202 and stores it in a table 712 (FIG. 7). Instead of the tree structure of the tier B and tier C nodes, the home gateway 202 can send the knowledge of which node B to push a packet destined for each of the tier C nodes (without knowing how tier B nodes forward the packet). In the alternative embodiment where each tier A node device sends its LSA to the home gateway 202 instead of flooding the network 200 with its LSA, the home gateway also now sends the neighboring relationships of all the tier A node devices. This step corresponds to step 416 described above. Step 612 is followed by step 614.

In step 614, the tier A node device 204 constructs the topology of the network 200 based on the neighboring relationships and the tree structure for the tier B and tier C nodes. Any technique can be used to construct the topology of the network 200. Step 614 is followed by step 616.

In step 616, the tier A node device 204 computes a routing table 714 using a routing protocol from the topology of the network 200. The routing protocol may be PEFT, DEFT, OSPF, or another routing protocol. The routing table 714 defines the next hops for every destination, and the traffic splitting ratios between the next hops. In one embodiment, the tier A node device 204 adds the fading levels (v) of its tier A links 708 to the corresponding link weights (w) so that a noisy wireless link is given a higher weight. Other alternative routing protocols, such as OSPF, can be used to compute the routing table 714. Step 616 is followed by step 618.

In step 618, the tier A node device 204 processes packets. For incoming packets, the tier A node device 204 determines if it is the destination node based on the destination IP address in the packets. When it is not the destination node, the tier A node device 204 looks up the destination node in the routing table 714 and splits the packets among the next hops to achieve the desired traffic splitting ratios. A similar process is used when tier A node device 204 sends packets.

As described above, the network 200 may have groups of nodes that share interest in common information. Assuming it is a member of such a group, the tier A node device 204 can multicast information to multiple recipients instead of unicasting the same information to multiple recipients. The tier A node device 204 can also receive the multicast of information from another member of the group. Step 618 is followed by step 620.

In step 620, the tier A node device 204 determines whether any of the links to its neighboring nodes is down. This step is the substantially the same as step 422 described above and therefore is not further elaborated. If any of its links is down, step 620 loops back to step 610 so all the tier A nodes can reconstruct their routing tables to compensate for the failed link. If its links are up, then step 620 is followed by step 622.

In step 622, the tier A node device 204 determines if a new node has appeared in network 200. The tier A node device 204 knows a new node has appeared when it receives the LSA from the node. If so, step 622 loops back to step 610 so all the tier A nodes can reconstruct their routing tables to include the new node. Otherwise step 622 loops back to step 618 where it continues to send or forward packets.

Figure 8:
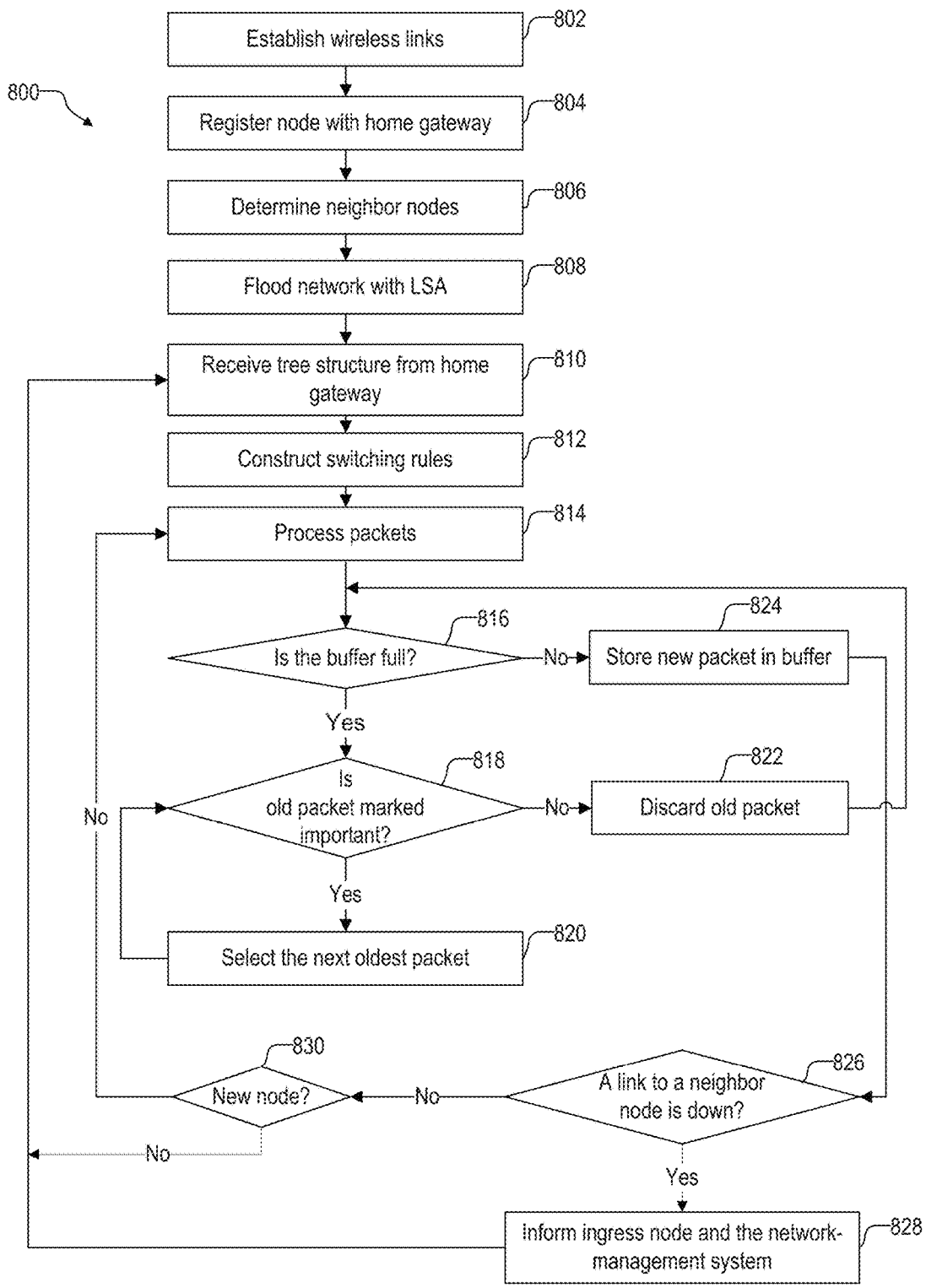
FIG. 8 is a flowchart of a method executed by a tier B or tier C node for implementing the hierarchical wireless network protocol in one embodiment of the disclosure.
Figure 9:
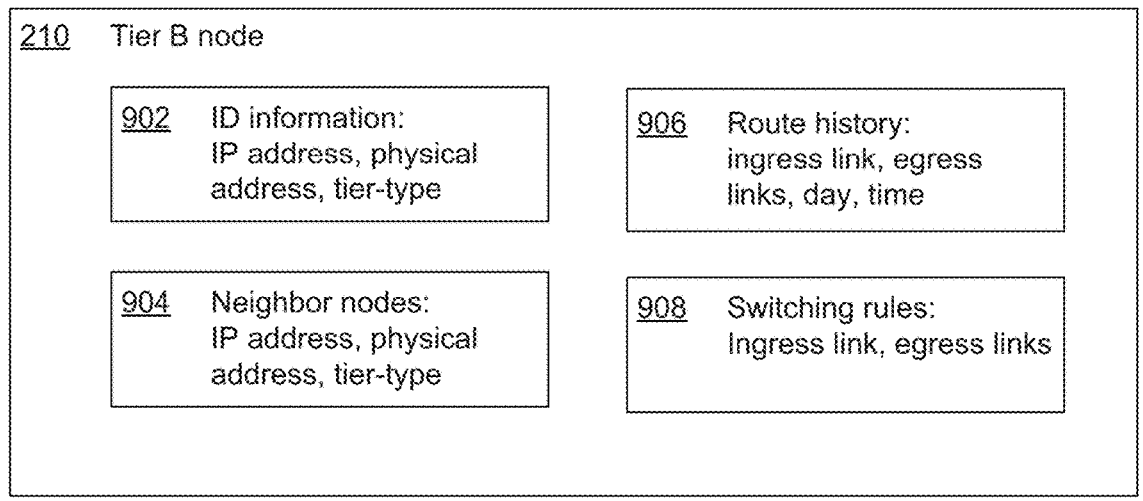
FIG. 9 illustrates the data structure for the tier B or tier C node in one embodiment of the disclosure.

FIG. 8 is a flowchart of a method 800 executed by each of the tier B and tier C nodes (e.g., tier B node device 210) in one embodiment of the disclosure. FIG. 9 is a block diagram of the data structure for the tier B node device 210 in one embodiment of the disclosure. The tier B node device 210 has ID information 902 such as its IP address, physical (MAC) address, and tier-type.

Referring back to FIG. 8, in step 802, the tier B node device 210 establishes wireless point-to-point unidirectional or bidirectional links with nodes in the network 200 that are within the range of its radio. Step 802 is followed by step 804.

In step 804, the tier B node device 210 registers with the home gateway 202 to join the network 200 as a new node in the same way a tier A node would in step 604. Step 804 is followed by step 806.

In step 806, the tier B node device 210 determines its neighboring nodes 904 (FIG. 9) in the same way a tier A node would in step 606. Step 806 is followed by step 808.

In step 808, the tier B node device 210 floods the network 200 with its LSA in a similar way as a tier A node would in step 608. However, the LSA may further include a route history 906 (FIG. 9) of the tier B node device 210. The route history 906 includes the switching rules based on times and days the rules are used. In the alternative embodiment introduced in steps 410 and 416 for the home gateway 202 and steps 610 and 612 for other tier A node devices, the tier B node device 210 only sends its LSA to the home gateway 202. Step 808 is followed by step 810.

In step 810, the tier B node device 210 receives the tree structure for the tier B and tier C nodes from the home gateway 202. Alternatively, the tier B node device 210 and the other tier B and tier C node devices form the tree structure themselves in a distributed manner. This step corresponds to step 416 described above. Step 810 is followed by step 812.

In step 812, the tier B node device 210 constructs the switching rules 908 (FIG. 9) based on the tree structure for the tier B and tier C nodes. Any technique can be used to construct the switching rules 914. For a tier B node, the switching rules define the ingress link from a parent node and the egress links to child nodes where the nodes are identified by their IP addresses. For a tier C node, the switching rules define the ingress link. Step 812 is followed by step 814.

In step 814, the tier B node device 210 processes packets. For incoming packets, the tier B node device 210 determines if it is the destination node based on the destination IP address in the packets. When it is not the destination node, the tier B node device 210 sends the packets to its ingress or egress nodes based on the switching rules and the destination IP addresses in the packets. A similar process is used when tier B node device 210 sends packets. Tier B node device 210 stores the route history 906 of the switching rules based on time and day.

As described above, the network 200 may have groups of nodes that share interest in common information. Assuming it is a member of such a group, the tier B node device 210 can multicast information to multiple recipients instead of unicasting the same information to multiple recipients. The tier B node device 210 can also receive the multicast of information from another member of the group. Step 814 is followed by step 816.

In step 816, the tier B node device 210 determines if its receive buffer has room to store incoming packets (e.g., if the buffer size is less than a threshold size). If the receive buffer has enough space to store the incoming packets, step 816 is followed by step 824. If the buffer does not have enough room to store the incoming packets, step 816 is followed by step 818.

In step 818, the tier B node device 210 selects the oldest packet in the receive buffer and determines whether the selected packet is marked as important (e.g., marked true in the one-bit important bit). If the selected packet is marked as important, step 818 is followed by step 820. If the selected packet is not marked as important, step 818 is followed by step 822.

In step 820, the tier B node device 210 selects the next oldest packet in the buffer. Step 820 loops back to step 818 where the tier B node device 210 determines whether the next oldest packet is marked important.

In step 822, the tier B node device 210 discards the selected unimportant packet. Step 822 loops back to step 816 where the tier B node device 210 again determines whether there is enough room to store the incoming packets. Steps 816 to 822 are repeated until enough unimportant old packets are discarded from the buffer to store the incoming packets.

In step 824, the tier B node device 210 stores the incoming packets in the receive buffer. Step 824 is followed by step 826.

In step 826, the tier B node device 210 determines whether any of the egress links is down the same way a tier A node would in step 620. If any of its egress links is down, step 826 is followed by step 828. Otherwise, step 826 is followed by step 830.

In step 828, the tier B node device 210 informs the parent node at the end of its ingress link and the home gateway 202 of the failed link. This process, also referred to as the "backpressure method," allows the parent node to perform a fast real time reroute and the home gateway 202 to keep a log of failure for offline data analysis. Step 828 loops back to step 810 where the tier B node device 210 receives a new tree structure from the home gateway 202 that compensates for the failed link. Alternatively, the tier B node device 210 and the other tier B and tier C node devices form a new tree structure themselves in a distributed manner that compensates for the failed link and provides the new tree structure to the home gateway 202.

In step 830, the tier B node device 210 determines if a new node has appeared in network 200 that affects the tree structure of the tier B and the tier C nodes. The tier B node device 210 knows such a new node has appeared when it receives a new tree structure from the home gateway 202. If so, step 830 loops back to step 810 so it can reconstruct its routing tables. Otherwise step 830 loops back to step 814 where it continues to send or forward packets.

FIG. 10 is a block diagram illustrating a computer program product 1000 of the hierarchical wireless network in one embodiment of the disclosure. Computer program product 1000 includes one or more sets of instructions 1002 that are configured to perform a disclosed task. Computer program product 1000 may be transmitted in a signal bearing medium 1004 or another similar communication medium 1006. Computer program product 1000 may be recorded in a computer readable medium 1010 or another similar recordable medium 1008.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for a device to implement one or more nodes in a wireless network to process packets, the method comprising:
    submitting a request to a network-management system in the wireless network to register a node in the wireless network;
    after having registered with the network-management system, identifying neighbor nodes of the node;
    flooding the wireless network with a link-state advertisement, wherein the link-state advertisement provides neighbor relationships of the node;
    constructing switching rules for the node based on a tree switching network portion of the wireless network;
    processing the packets received by the node with the switching rules, wherein the switching rules define at least one of:
        an ingress link to a parent node of the node, wherein the parent node has a power capability greater than that of the node, and egress links to child nodes of the node, wherein each of the child nodes has a mobility greater than that of the node; and in response to a determination of a failed link to one of the identified neighbor nodes, informing the parent node, at an end of the ingress link and the network-management system, of the failed link.

2. The method of claim 1, further comprising receiving a first tree structure for the tree switching network portion from the network-management system.

3. The method of claim 1, further comprising forming a first tree structure for the tree switching network portion in a first distributed manner.

4. The method of claim 1, further comprising recording a route history, wherein the route history comprises:
the switching rules, and
days and times when the switching rules are used.

5. The method of claim 4, further comprising sending the route history to the network-management system.

6. The method of claim 1, further comprising submitting a request to the network-management system to join a group of nodes that share a common interest and receive a membership list of the group.

7. The method of claim 6, further comprising one of sending a first multicast of packets to the nodes in the group and receiving a second multicast of packets from the nodes in the group.

8. The method of claim 1, further comprising:
in response to a determination that a receive buffer is full:
selecting one or more of the packets by age, and
discarding the selected packets when the selected packets are not marked as important.

9. The method of claim 2, further comprising receiving a second tree structure for the tree switching network portion from the network-management system, wherein the second tree structure compensates for the failed link.

10. The method of claim 3, further comprising forming a second tree structure for the tree switching network portion in a second distributed manner, wherein the second tree structure compensates for the failed link.

11. A non-transitory computer-readable storage medium encoded with computer-executable instructions, which in response to execution by a device, causes the device to implement one or more nodes in a wireless network to process packets according to a method comprising:
submitting a request to a network-management system in the wireless network to register a node in the wireless network;
after having registered with the network-management system, identifying neighbor nodes of the node;
flooding the wireless network with a link-state advertisement, wherein the link-state advertisement provides neighbor relationships of the node;
constructing switching rules for the node based on a tree switching network portion of the wireless network;
processing the packets received by the node with the switching rules, wherein the switching rules define at least one of:
an ingress link to a parent node of the node, wherein the parent node has a power capability greater than that of the node, and
egress links to child nodes of the node, wherein each of the child nodes has a mobility greater than that of the node; and in response to a determination of a failed link to one of the identified neighbor nodes, informing the parent node, at an end of the ingress link and the network-management system, of the failed link.

12. The non-transitory computer-readable storage medium of claim 11, wherein the method performed by the device that executes the instructions further comprises receiving a first tree structure for the tree switching network portion from the network-management system.

13. The non-transitory computer-readable storage medium of claim 11, wherein the method performed by the device that executes the instructions further comprises forming a first tree structure for the tree switching network portion in a first distributed manner.

14. The non-transitory computer-readable storage medium of claim 11, wherein the method performed by the device that executes the instructions further comprises recording a route history, and wherein the route history comprises:
the switching rules, and
days and times when the switching rules are used.

15. The non-transitory computer-readable storage medium of claim 14, wherein the method performed by the device that executes the instructions further comprises sending the route history to the network-management system.

16. The non-transitory computer-readable storage medium of claim 11, wherein the method performed by the device that executes the instructions further comprises submitting a request to the network-management system to join a group of nodes that share a common interest and receive a membership list of the group.

17. The non-transitory computer-readable storage medium of claim 16, wherein the method performed by the device that executes the instructions further comprises one of sending a first multicast of packets to the nodes in the group and receiving a second multicast of packets from the nodes in the group.

18. The non-transitory computer-readable storage medium of claim 11, wherein the method performed by the device that executes the instructions further comprises, in response to a determination that a receive buffer is full:
selecting one or more of the packets by age, and
discarding the selected packets when the selected packets are not marked as important.

19. The non-transitory computer-readable storage medium of claim 12, wherein the method performed by the device that executes the instructions further comprises receiving a second tree structure for the tree switching network portion from the network-management system, and wherein the second tree structure compensates for the failed link.

20. The non-transitory computer-readable storage medium of claim 13, wherein the method performed by the device that executes the instructions further comprises forming a second tree structure for the tree switching network portion in a second distributed manner, and wherein the second tree structure compensates for the failed link.

* * * * *